United States Patent
Yamada et al.

(10) Patent No.: US 10,066,042 B2
(45) Date of Patent: Sep. 4, 2018

(54) PHOTOCURABLE RESIN COMPOSITION, CURED PRODUCT THEREOF, AND PLASTIC LENS

(71) Applicant: DIC Corporation, Tokyo (JP)

(72) Inventors: Shunsuke Yamada, Ichihara (JP); Takeshi Ibe, Sakura (JP); Nobuo Kobayashi, Ichihara (JP); Yasuko Odani, Ichihara (JP); Masashi Sugiyama, Ichihara (JP)

(73) Assignee: DIC Corporation, Tokyo (JP)

( * ) Notice: Subject to any disclaimer, the term of this patent is extended or adjusted under 35 U.S.C. 154(b) by 71 days.

(21) Appl. No.: 14/907,925

(22) PCT Filed: Jun. 17, 2014

(86) PCT No.: PCT/JP2014/065980
§ 371 (c)(1),
(2) Date: Jan. 27, 2016

(87) PCT Pub. No.: WO2015/012020
PCT Pub. Date: Jan. 29, 2015

(65) Prior Publication Data
US 2017/0145137 A1    May 25, 2017

(30) Foreign Application Priority Data
Jul. 26, 2013  (JP) ................. 2013-155594

(51) Int. Cl.
*C08F 290/06* (2006.01)
*G02B 1/04* (2006.01)

(52) U.S. Cl.
CPC .......... *C08F 290/067* (2013.01); *G02B 1/041* (2013.01)

(58) Field of Classification Search
CPC .. C08F 290/067; C08F 290/149; G02B 1/041; C08G 18/7671; C08G 18/7621; C08G 18/7628; C08G 18/8125; C08G 18/721; C08G 18/00; C08G 18/725
USPC ........................................ 522/96, 90; 528/67
See application file for complete search history.

(56) References Cited

U.S. PATENT DOCUMENTS

| | | | | |
|---|---|---|---|---|
| 4,666,783 A | * | 5/1987 | Heil | C08G 18/672 252/62.54 |
| 5,805,358 A | * | 9/1998 | Yamashita | G02B 1/041 359/742 |
| 2002/0022130 A1 | * | 2/2002 | Kohl | C08G 18/672 428/423.1 |
| 2005/0261392 A1 | | 11/2005 | Futami et al. | |

FOREIGN PATENT DOCUMENTS

| | | |
|---|---|---|
| CN | 1703433 A | 11/2005 |
| JP | 10-324726 A | 12/1998 |

OTHER PUBLICATIONS

"Dictionary of Petrochemical Technology" edited by Hongfa Zhu, Jun. 2012, JinDun Publisher and translation of related portion thereof. (cited in the Jan. 6, 2017 CN OA).
International Search Report and Written Opinion dated Sep. 2, 2014, issued for PCT/JP2014/065980.

* cited by examiner

*Primary Examiner* — Sanza Mcclendon
(74) *Attorney, Agent, or Firm* — Locke Lord LLP

(57) ABSTRACT

Provided is a photocurable resin composition that has a low viscosity and is capable of yielding a high refractive index. Specifically, a urethane (meth)acrylate resin (A) obtained by a reaction of an aromatic diisocyanate compound (a), a polyol compound (b), and a hydroxyl-group-containing (meth)acrylate compound (c) as essential raw material components is used. The urethane (meth)acrylate resin (A) contains a structural moiety (a-1) represented by structural formula (1) below:

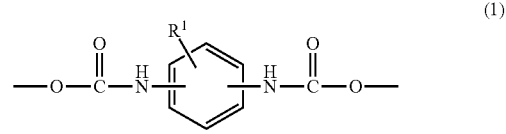

(1)

(where $R^1$ represents a hydrogen atom or a methyl group) and a structural moiety (a-2) represented by structural formula (2) below:

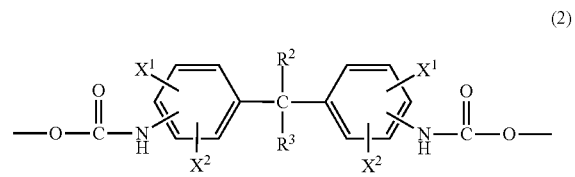

(2)

(where $R^1$, $R^2$, $R^3$, $X^1$, and $X^2$ each independently represent a hydrogen atom or a methyl group) at a (a-1)/(a-2) molar ratio of 45/55 to 60/40. The polyol compound (b) has an aromatic hydrocarbon skeleton.

8 Claims, No Drawings

PHOTOCURABLE RESIN COMPOSITION, CURED PRODUCT THEREOF, AND PLASTIC LENS

TECHNICAL FIELD

The present invention relates to a photocurable resin composition suitable for use in Fresnel lens sheets and lenticular sheets used in projection screens of projection televisions and the like, prism sheets and microlens sheets used as backlights of liquid crystal display devices, etc., moth-eye films used as antireflection films of flat-screen televisions, and the like.

BACKGROUND ART

In recent years, optical sheets that have fine texture patterns on their surfaces and offer intended functions with this textured structure refracting light have become indispensable for displays such as liquid crystal display devices, and these optical sheets are required to have various properties such as high refractive indices and a shape retaining property. Examples of the optical sheets include Fresnel lens sheets and lenticular sheets used in projection screens of projection televisions etc., prism sheets and microlens sheets used as backlights of liquid crystal display devices etc., and moth-eye films which have recently drawn attention as the antireflection films for flat-screen televisions.

These optical sheets, for example, a prism sheet (optical sheet) used for a backlight of a liquid crystal display device or the like, is formed by using a resin material, and this resin material is required to have performance and properties at high levels. For example, the resin material must be in a liquid state, must be of a solvent-free type so that the production process does not need a solvent drying time, must have a low viscosity suitable for coating despite being of a solvent-free type, and must have a high refractive index so as to maintain luminance at a small quantity of light.

As such a material having a high refractive index, a urethane acrylate having high aromaticity obtained by reacting bisphenol F diethoxy glycol, tolylene diisocyanate, and 2-hydroxyethyl acrylate in the molecular structure is known, and a technique of producing an optical sheet by using this urethane acrylate as a main component is known (for example, refer to PTL 1).

However, although the optical sheet described in PTL 1 achieves a high refractive index of 1.55 or more due to the highly aromatic resin material, the optical sheet does not currently satisfy the high refractive index property recently required for lens sheets to achieve ever higher luminance. Attempts have been made to use isocyanate compounds having higher aromaticity, for example, diphenylmethane diisocyanate, in order to achieve an ever higher refractive index; however, in this case, the resin material exhibits high viscosity and becomes crystalline, which makes forming into optical components difficult.

CITATION LIST

Patent Literature

PTL 1: Japanese Unexamined Patent Application No. 10-324726

SUMMARY OF INVENTION

Technical Problem

Accordingly, an object of the present invention is to provide a photocurable resin composition that has a low viscosity as a resin composition itself, has excellent formability into a sheet product, in particular, an optical sheet having a fine texture pattern on the surface, and is capable of yielding a high refractive index, and a cured product and a plastic lens that have such properties.

Solution to Problem

The inventors of the present invention have conducted extensive studies to resolve the issues described above and found that a urethane (meth)acrylate prepared by combining particular aromatic diisocyanates at a particular ratio and using an aromatic diol as a diol component has a low viscosity and yields a significantly high refractive index. Thus, the present invention has been made.

In other words, the present invention provides a photocurable resin composition that includes a urethane (meth) acrylate resin (A) and a polymerizable diluting agent (B) as essential components, in which the urethane (meth)acrylate resin is obtained by a reaction of an aromatic diisocyanate compound (a), a polyol compound (b), and a hydroxyl-group-containing (meth)acrylate compound (c) as essential raw material components, and contains, as urethane structural moieties, a structural moiety (a-1) represented by structural formula (1) below:

[Chem. 1]

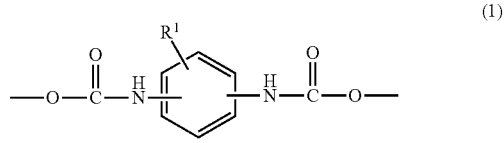

(where $R^1$ represents a hydrogen atom or a methyl group) and a structural moiety (a-2) represented by structural formula (2) below:

[Chem. 2]

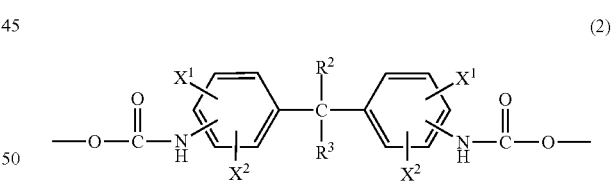

(where $R^1$, $R^2$, $R^3$, $X^1$, and $X^2$ each independently represent a hydrogen atom or a methyl group) at a (a-1)/(a-2) molar ratio of 45/55 to 60/40; and the polyol compound (b) has an aromatic hydrocarbon skeleton.

The present invention also provides a cured product obtained by curing the photopolymerizable composition.

The present invention also provides a plastic lens obtained by curing the photocurable resin composition.

Advantageous Effects of Invention

According to the present invention, a photocurable resin composition that has a low viscosity as a resin composition itself, has excellent formability into a sheet product, in particular, an optical sheet having a fine texture pattern on the surface, and is capable of yielding a high refractive index, and a cured product and a plastic lens that have such properties can be provided.

DESCRIPTION OF EMBODIMENTS

The urethane (meth)acrylate resin (A) used in the present invention is a urethane (meth)acrylate resin obtained by a reaction of an aromatic diisocyanate compound (a), a polyol compound (b), and a hydroxyl-group-containing (meth) acrylate compound (c) as essential raw material components, and contains, as urethane structural moieties derived from the aromatic diisocyanate compound (a), a structural moiety (a-1) represented by structural formula (1) below:

[Chem. 3]

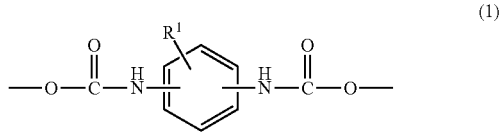

(where $R^1$ represents a hydrogen atom or a methyl group) and a structural moiety (a-2) represented by structural formula (2) below:

[Chem. 4]

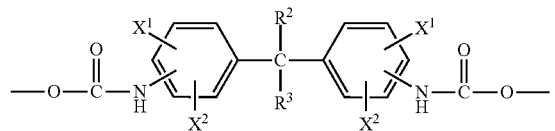

(where $R^1$, $R^2$, $R^3$, $X^1$, and $X^2$ each independently represent a hydrogen atom or a methyl group)
at a (a-1)/(a-2) molar ratio of 45/55 to 60/40; and the polyol compound (b) has an aromatic hydrocarbon skeleton. Furthermore, the polyol compound (b) has an aromatic hydrocarbon skeleton. In the present invention, as described above, in the resin structure of the urethane (meth)acrylate resin (A), the structural moiety (a-1) and the structural moiety (a-2) are allowed to exist at a (a-1)/(a-2) molar ratio of 45/55 to 60/40, and the structural moiety derived from the polyol compound (b) has an aromatic hydrocarbon skeleton; thus, the composition has significantly high aromaticity and a low-viscosity photocurable resin composition that achieves high refractive index can be prepared. Usually, a resin having such high aromaticity becomes highly crystalline or highly viscous and cannot easily be formed into an optical sheet having a fine texture pattern. However, in the present invention, the crystallinity is suppressed but the material yields a high refractive index, which is worth noting.

The structural moiety (a-1) and the structural moiety (a-2) are urethane structural moieties derived from the aromatic diisocyanate compound (a) used as a raw material. $R^1$ in structural formula (1) representing the structural moiety (a-1) is a hydrogen atom or a methyl group. Specific examples of the aromatic diisocyanate compound (a) include 1,3-phenylene diisocyanate, 1,4-phenylene diisocyanate, 2,4-tolylene diisocyanate, and 2,6-tolylene diisocyanate.

Among these, 2,4-tolylene diisocyanate and 2,6-tolylene diisocyanate are preferable since particularly high aromaticity is maintained and the effect of decreasing the viscosity is enhanced.

In structural formula (2) representing the structural moiety (a-2), $R^2$ each independently represent a hydrogen atom or a methyl group, $R^3$ each independently represent a hydrogen atom or a methyl group, $X^1$ each independently represent a hydrogen atom or a methyl group, and $X^2$ each independently represent a hydrogen atom or a methyl group.

Specific examples of the raw-material aromatic diisocyanate compound (a) that corresponds to the structural moiety (a-2) include 4,4'-diphenylmethane diisocyanate, 2,2'-bis(paraphenylisocyanate)propane, and 3,3'-dimethyl-4,4'-diphenylmethane diisocyanate.

In the present invention, 4,4'-diphenylmethane diisocyanate or 3,3'-dimethyl-4,4'-diphenylmethane diisocyanate is particularly preferable among these since the effect of suppressing crystallization of the resulting urethane acrylate is enhanced.

As discussed above, the urethane (meth)acrylate resin (A) used in the present invention is obtained by a reaction of an aromatic diisocyanate compound (a), a polyol compound (b), and a hydroxyl-group-containing (meth)acrylate compound (c) as essential raw material components, and the polyol compound (b) is characterized in having an aromatic skeleton in its molecular structure. Since the polyol compound (b) has the aromatic skeleton, the cured product obtained therefrom exhibits a significantly high refractive index.

Specific examples of the polyol compound (b) include aromatic polyols such as hydroquinone, catechol, 1,4-benzene dimethanol, 3,3'-biphenyldiol, 4,4'-biphenyldiol, biphenyl-3,3'-dimethanol, biphenyl-4,4'-dimethanol, bisphenol A, bisphenol B, bisphenol F, bisphenol S, 1,4-dihydroxynaphthalene, 1,6-dihydroxynaphthalene, 2,7-naphthalenediol, binaphthol, bis(2,7-dihydroxynaphthyl)methane, and 4,4',4"-methylidynetrisphenol;

polyether-modified aromatic polyols obtained by ring-opening polymerization of the aromatic polyols described above and various cyclic ether compounds such as ethylene oxide, propylene oxide, tetrahydrofuran, ethyl glycidyl ether, propyl glycidyl ether, butyl glycidyl ether, phenyl glycidyl ether, and allyl glycidyl ether;

lactone-modified aromatic polyols obtained by polycondensation of the aromatic polyols and cyclic ester compounds described below;

aromatic-ring-containing polyester polyols obtained by reactions of the aromatic polyols and aliphatic dicarboxylic acids such as malonic acid, succinic acid, glutaric acid, adipic acid, and pimelic acid; and aromatic-ring-containing polyester polyols obtained by reactions of the aliphatic polyols and aromatic dicarboxylic acids or anhydrides thereof such as phthalic acid, phthalic anhydride, terephthalic acid, isophthalic acid, and orthophthalic acid.

These may be used alone or in combination of two or more. Among these, polyether-modified bisphenol compounds obtained by ring-opening polymerization of various cyclic ether compounds and bisphenol compounds such as bisphenol A, bisphenol B, bisphenol S, and bisphenol F are preferable since the cured coating film exhibits a high refractive index and particularly high toughness.

Specific examples of the hydroxyl-group-containing (meth)acrylate compound (c) include aliphatic (meth)acrylate compounds such as 2-hydroxyethyl (meth)acrylate, 2-hydroxypropyl (meth)acrylate, 4-hydroxybutyl (meth)

acrylate, neopentyl glycol mono(meth)acrylate, 4-hydroxycyclohexyl (meth)acrylate, 1,6-hexanediol mono(meth)acrylate, glycerin di(meth)acrylate, trimethylolpropane di(meth)acrylate, pentaerythritol tri(meth)acrylate, and dipentaerythritol penta(meth)acrylate;

(meth)acrylate compounds intramolecularly having an aromatic ring, such as 4-hydroxyphenyl (meth)acrylate, β-hydroxyphenethyl (meth)acrylate, 4-hydroxyphenethyl (meth)acrylate, 1-phenyl-2-hydroxyethyl (meth)acrylate, 3-hydroxy-4-acetylphenyl (meth)acrylate, and 2-hydroxy-3-phenoxypropyl acrylate; and the hydroxyl-group-containing acryloyl-group-containing compounds with cyclic ester compounds added thereto.

Examples of the cyclic ester compounds include γ-butyrolactone, γ-valerolactone, δ-valerolactone, ε-caprolactone, ε-methylcaprolactone, ε-ethylcaprolactone, ε-propylcaprolactone, 3-penten-4-olide, 12-dodecanolide, and γ-dodecanolactone.

When a hydroxyl-group-containing acryloyl-group-containing compound with a cyclic ester compound added thereto is to be used, the compound is preferably prepared by adding 2 to 4 moles of a cyclic ester compound to 1 mole of a hydroxyl-group-containing acryloyl-group-containing compound so that the refractive index of the cured product can be maintained at a high level while achieving a suitable degree of flexibility and an excellent shape restoring property.

Among these, 2-hydroxyethyl (meth)acrylate or its ε-caprolactone adduct is preferable for its good restoring property for plastic lens applications. If the latter is to be used, the adduct is preferably prepared by adding 2 or 3 moles of ε-caprolactone adduct to 1 mole of 2-hydroxyethyl (meth)acrylate.

An example of the method for inducing reaction of the aromatic diisocyanate compound (a), the polyol compound (b), and the hydroxyl-group-containing (meth)acrylate compound (c) described in detail above is a method that includes causing the aromatic diisocyanate compound (a) to react with the polyol compound (b) within the temperature range of 20° C. to 120° C. optionally in the presence of a known urethanation catalyst in such a manner that the molar ratio of the hydroxyl groups of the polyol compound (b) to the isocyanate groups of the aromatic diisocyanate compound (a), (OH)/(NCO) molar ratio, is in the range of 1/1.5 to 1/2.5 so as to obtain an isocyanate-group-containing intermediate as a reaction product; and causing the intermediate to react with the hydroxyl-group-containing (meth)acrylate compound (c) in the molecular structure within the temperature range of 20° C. to 120° C. optionally in the presence of a known urethanation catalyst in such manner that the ratio of the hydroxyl groups of the hydroxyl-group-containing (meth)acrylate compound (c) to the isocyanate groups of the intermediate, the (OH)/(NCO) molar ratio, is within the range of 1/0.95 to 1/1.05.

Examples of the method for producing the urethane (meth)acrylate resin (A) include a method that involves feeding the aromatic diisocyanate compound (a), the polyol compound (b), and the hydroxyl-group-containing (meth)acrylate compound (c) all at once in carrying out the reaction, and a method that involves causing the aromatic diisocyanate compound (a) to react with the hydroxyl-group-containing (meth)acrylate compound (c) and then causing the reaction product to react with the polyol compound (b).

The urethane (meth)acrylate resin (A) obtained as such offers a composition having a lower viscosity. The viscosity of the composition at 25° C., the composition containing 30% to 50% by mass of a polymerizable diluting agent, is within the range of 10 to 500 Pa·s.

Among the urethane (meth)acrylate resins (A) described in detail above, a urethane (meth)acrylate resin itself having a refractive index of 1.55 or more at 25° C. is preferable. In particular, when 2-hydroxyethyl (meth)acrylate is used as the hydroxyl-group-containing (meth)acrylate compound (c), a urethane (meth)acrylate resin having a refractive index of 1.59 or more is preferable.

Examples of the polymerizable diluting agent (B) used in the photocurable resin composition of the present invention includes high-refractive-index monofunctional (meth)acrylate compounds such as phenylbenzyl (meth)acrylate (PBA), phenylthioethyl (meth)acrylate (PTEA), o-phenylphenoxyethyl (meth)acrylate (OPPEA), and naphthylthioethyl (meth)acrylate (NTEA); other monofunctional (meth)acrylates such as n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, benzyl (meth)acrylate, glycidyl (meth)acrylate, morpholine (meth)acrylate, 2-hydroxyethyl (meth)acrylate, 2-hydroxypropyl (meth)acrylate, 4-hydroxybutyl (meth)acrylate, diethylene glycol mono(meth)acrylate, triethylene glycol mono(meth)acrylate, dipropylene glycol mono(meth)acrylate, 2-methoxyethyl (meth)acrylate, methoxydiethylene glycol (meth)acrylate, methoxytriethylene glycol (meth)acrylate, methoxy polyethylene glycol (meth)acrylate, 2-butoxyethyl (meth)acrylate, butoxytriethylene glycol (meth)acrylate, 2-ethoxyethyl (meth)acrylate, 2-(2-ethoxyethoxy)ethyl (meth)acrylate, ethoxy polyethylene glycol (meth)acrylate, 4-nonylphenoxy ethylene glycol (meth)acrylate, tetrahydrofurfuryl (meth)acrylate, caprolactone-modified tetrahydrofurfuryl (meth)acrylate, cyclohexyl (meth)acrylate, isobornyl (meth)acrylate, 2-hydroxy-3-phenoxypropyl (meth)acrylate, cyclohexyl (meth)acrylate, cyclohexylmethyl (meth)acrylate, cyclohexylethyl (meth)acrylate, dicyclopentanyl (meth)acrylate, dicyclopentanyloxyethyl (meth)acrylate, dicyclopentenyl (meth)acrylate, dicyclopentenyloxyethyl (meth)acrylate, phenoxyethyl (meth)acrylate, and phenoxydiethylene glycol (meth)acrylate;

difunctional aliphatic (meth)acrylate compounds such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dicyclopentanyl di(meth)acrylate, glycerol di(meth)acrylate, neopentyl glycol hydroxypivalate ester di(meth)acrylate, caprolactone-modified hydroxypivalate neopentyl glycol di(meth)acrylate, hydropivalaldehyde-modified trimethylolpropane di(meth)acrylate, and 1,4-cyclohexane dimethanol di(meth)acrylate; and trifunctional or higher functional aliphatic (meth)acrylate compounds such as trimethylolpropane tri(meth)acrylate, a tri(meth)acrylate of an ethylene oxide adduct of trimethylolpropane, a tri(meth)acrylate of a propylene oxide adduct of trimethylolpropane, pentaerythritol tri(meth)acrylate, glycerol tri(meth)acrylate, a tri(meth)acrylate of alkyl-modified dipentaerythritol, ditrimethylolpropane tetra (meth)acrylate, a tetra(meth)acrylate of an ethylene oxide adduct of ditrimethylolpropane, a tetra(meth)acrylate of a propylene oxide adduct of a ditrimethylolpropane, a penta(meth)acrylate of dipentaerythritol, and a hexa(meth)acrylate of dipentaerythritol.

Among these, monofunctional (meth)acrylates are preferable from the viewpoint of decreasing the viscosity of the photocurable resin composition. In particular, phenylbenzyl (meth)acrylate (PBA) or o-phenylphenoxyethyl (meth)acrylate (OPPEA) is preferable since coloring of the compound itself is less and the refractive index is high.

The polyol compound (b) content relative to the combined mass of the urethane (meth)acrylate resin (A) is preferably 10% to 80% by mass since the refractive index increasing effect and the viscosity decreasing effect become notable. More preferably, the content is 30% to 90% by mass.

In the present invention, the resin solution in this state can be used as a resin component for forming plastic lenses. In order to prepare a coating solution for forming a plastic lens from this resin component for plastic lenses, a photopolymerization initiator (C) described below is added to the resin component and, if needed, the polymerizable diluting agent (b) is further added to adjust the viscosity (25° C.) of the entire composition to be within the range of 100 mPa·s to 8000 mPa·s.

Examples of the photopolymerization initiator (C) that can be used include 1-hydroxycyclohexylphenylketone, 2-hydroxy-2-methyl-1-phenylpropan-1-one, 1-[4-(2-hydroxyethoxy)phenyl]-2-hydroxy-2-methyl-1-propan-1-one, 2,2'-dimethoxy-1,2-diphenylethan-1-one, 2,4,6-trimethylbenzoyldiphenylphosphine oxide, bis(2,4,6-trimethylbenzoyl)phenylphosphine oxide, 2-methyl-1-[4-(methylthio)phenyl]-2-morpholino-1-propanone, 2-benzyl-2-dimethylamino-1-(4-morpholinophenyl)-butan-1-one, benzophenone, 4-methylbenzophenone, 4-phenylbenzophenone, 4-(4-methylphenylthio)benzophenone, thioxanthone, 2-isopropylthioxanthone, 4-isopropylthioxanthone, 2,4-dimethylthioxanthone, 2,4-diethylthioxanthone, 2,4-diisopropylthioxanthone, and 2,4-dichlorothioxanthone.

Among these, 4-phenylbenzophenone, 4-(4-methylphenylthio)benzophenone, thioxanthone, 2-isopropylthioxanthone, 4-isopropylthioxanthone, 2,4-diethylthioxanthen-9-one, and the like are preferable since they have excellent curability. In particular, benzophenone-based photopolymerization initiators that have an aromatic nucleus as a substituent, such as 4-phenylbenzophenone and 4-(4-methylphenylthio)benzophenone, are preferable.

In order to achieve sufficient curability, preferably 0.1 to 25 parts by mass and more preferably 2 to 25 parts by mass of the photopolymerization initiator (C) is contained in 100 parts by mass of the (meth)acryloyl-group-containing photopolymerizable substance (A).

In the present invention, when a benzophenone-based photopolymerization initiator having an aromatic nucleus as a substituent, such as 4-phenylbenzophenone or 4-(4-methylphenylthio)benzophenone, is used as the photopolymerization initiator (C), a photopolymerization initiator that has optical sensitivity in a long wavelength range of 380 nm or more and 600 nm or less, such as 2,4,6-trimethylbenzoyldiphenylphosphine oxide, is preferably used in combination since curability is improved; moreover, a photopolymerization initiator having optical sensitivity in a short wavelength range of 200 nm or more and 380 nm or less such as 1-hydroxycyclohexylphenylketone or 2,2-dimethoxy-1,2-diphenylethan-1-one is preferably used in combination since curability is enhanced. In particular, the photopolymerization initiator having optical sensitivity in the long wavelength range and the photopolymerization initiator having optical sensitivity in the short wavelength range are preferably used in combination since curability is further enhanced.

The photocurable resin composition of the present invention may contain, as polymerization components, some amounts of an epoxy (meth)acrylate, a fluorene-skeleton-including di(meth)acrylate, or an acrylate compound having a polyoxyalkylene structure in addition to the urethane (meth)acrylate resin (A) and the polymerizable diluting agent (B) as long as the effects of the present invention are not impaired.

Specific examples of the epoxy (meth)acrylate include those obtained by causing an epoxy resin to react with a (meth)acrylic acid or an anhydride thereof.

Specific examples of the epoxy resin to be reacted with a (meth)acrylic acid or an anhydride thereof include diglycidyl ethers of dihydric phenols such as hydroquinone and catechol; diglycidyl ethers of biphenol compounds such as 3,3'-biphenyldiol and 4,4'-biphenylriol; bisphenol-type epoxy resins such as bisphenol A epoxy resins, bisphenol B epoxy resins, bisphenol F epoxy resins, and bisphenol S epoxy resins; polyglycidyl ethers of naphthol compounds such as 1,4-naphthalenediol, 1,5-naphthalenediol, 1,6-naphthalenediol, 2,6-naphthalenediol, 2,7-naphthalenediol, binaphthol, and bis(2,7-dihydroxynaphthyl)methane; triglycidyl ethers such as 4,4',4''-methylidynetrisphenol; novolac epoxy resins such as phenol novolac epoxy resins and cresol novolac resins;

polyglycidyl ethers of polyether-modified aromatic polyols obtained by ring-opening polymerization of the biphenol compound, bisphenol A, bisphenol B, bisphenol F, bisphenol S, or a naphthol compound with any of various cyclic ether compounds such as ethylene oxide, propylene oxide, tetrahydrofuran, ethyl glycidyl ether, propyl glycidyl ether, butyl glycidyl ether, phenyl glycidyl ether, and allyl glycidyl ether; and polyglycidyl ethers of lactone-modified aromatic polyols obtained by polycondensation of the biphenol compound, bisphenol A, bisphenol B, bisphenol F, bisphenol S, or a naphthol compound with a lactone compound such as ε-caprolactone.

Among these, those having an aromatic ring skeleton in the molecular structure are preferable since a cured product of the final product epoxy (meth)acrylate exhibits a high refractive index. In particular, the bisphenol epoxy resin or a the polyglycidyl ether of the naphthol compound are preferred, and the bisphenol epoxy resin is more preferred since a cured coating film having a higher refractive index and high adhesiveness to a plastic film substrate even under high-temperature high-humidity conditions is obtained.

Among bisphenol epoxy resins, those having an epoxy equivalent in the range of 160 to 1,000 g/eq and more preferably 165 to 600 g/eq are more preferable since a coating film having a higher refractive index and higher hardness is obtained.

The (meth)acrylic acid or the anhydride thereof to be reacted with the epoxy resin is preferably acrylic acid since a photocurable resin composition having excellent curability is obtained.

Examples of the fluorene-skeleton-containing di(meth)acrylate include compounds represented by structural formula (2) below:

[Chem. 5]

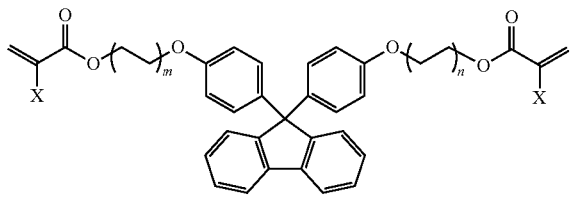

(2)

(where X represents a hydrogen atom or a methyl group, and m and n each independently represent an integer of 0 to 5).

The acrylate compound having a polyoxyalkylene structure described above is a compound intramolecularly having a polyoxyalkylene structure, such as a polyethylene glycol chain or a polypropylene glycol chain. Examples thereof include diacrylates of polyethylene glycol having 4 to 15 ethylene oxide units, monoacrylates of polyethylene glycol having 4 to 15 ethylene oxide units, diacrylates of polypropylene glycol having 4 to 15 propylene oxide units, monoacrylates of polypropylene glycol having 4 to 15 propylene oxide units, ethylene oxide-modified glycerol triacrylate (3 to 10 EO units), propylene oxide-modified glycerol triacrylate (3 to 10 PO units), ethylene oxide-modified trimethylolpropane triacrylate (4 to 20 EO units), propylene oxide-modified trimethylolpropane triacrylate (4 to 20 PO units), diacrylates of ethylene oxide adducts of bisphenol having 4 to 15 ethylene oxide units, and diacrylates of propylene oxide adducts of bisphenol having 4 to 15 propylene oxide units.

In such a case, the blend ratio of the epoxy (meth)acrylate, the fluorene-skeleton-containing di(meth)acrylate, or the acrylate compound having a polyoxyalkylene structure is preferably 40% to 60% by mass of the polymerization components.

The high-refractive-index monofunctional (meth)acrylate compound described above is preferably added to epoxy (meth)acrylate or urethane (meth)acrylate since a cured product thereof exhibits a higher refractive index.

The photocurable resin composition of the present invention may contain various photosensitizers in addition to the photopolymerization initiator (C). Examples of the photosensitizers include amines, ureas, sulfur-containing compounds, phosphorus-containing compounds, chlorine-containing compounds, nitriles, and other nitrogen-containing compounds. These may be used alone or in combination of two or more. The amount of the photosensitizer to be added is preferably in the range of 0.01 to 25 parts by mass relative to 100 parts by mass of the urethane (meth)acrylate resin (A).

The photocurable resin composition of the present invention may contain various other additives if needed. Examples of the additives include an UV absorber, an antioxidant, a silicone additive, a fluorine additive, a rheology controller, a defoaming agent, an antistatic agent, and an antifog additive. The amount of the additives added is preferably in the range of 0.01 to 40 parts by mass relative to 100 parts by mass of the photocurable resin composition of the present invention since this is the range in which the effects of the additives are fully exhibited and the UV curing is not obstructed.

The viscosity of the photocurable resin composition of the present invention is preferably 6,000 mPa·s or less since the resin composition can unfailingly fill details of a mold even under high-speed coating conditions.

The photocurable resin composition of the present invention can be cured by irradiation with UV light or visible light.

For UV curing, a mercury lamp such as an ultrahigh pressure mercury lamp, a high pressure mercury lamp, or a low pressure mercury lamp, a xenon lamp, a carbon arc, a metal halide lamp, or the like may be used for irradiation and curing. The exposure dose of the UV light during this process is preferably in the range of 0.1 to 1000 mJ/cm$^2$.

A cured product of the photocurable resin composition of the present invention has a high refractive index, excellent flexibility, and resistant to cracking and chipping during cutting. Owing to these attributes, the cured product is suitable for use in various optical materials such as plastic lenses, e.g., eyeglass lenses, digital camera lenses, Fresnel lenses, and prism lenses, optical overcoating agents, hard coat agents, antireflection films, optical fibers, optical waveguides, holograms, prism lenses, LED sealing materials, and coating materials for solar cells. The product is particularly suitable for use in plastic lenses such as prism lenses for liquid crystal substrates among these.

The prism lens for liquid crystal substrates is a sheet-shape lens that has fine prism-shape portions on one side of a sheet-shape member. The sheet-shape lens is usually disposed on the rear side (light-source side) of a liquid crystal display device in such a manner that the prism surface faces the device side, and a light-guiding sheet is disposed on the rear surface of the sheet-shape lens. Alternatively, the prism lens may be a sheet-shape lens in which the prism lens also functions as a light-guiding sheet.

The shape of the prism portion of the prism lens is preferably that the apex angle θ of the prism is in the range of 70° to 110° since a light-condensing property is enhanced and luminance is improved. The angle is more preferably in the range of 75° to 100° and more preferably in the range of 80° to 95°.

The prism pitch is preferably 100 μm or less and more preferably 70 μm or less since the moire patterns occurring in the screen are prevented and the screen resolution is improved. The height of the prism texture is determined from the apex angle θ of the prism and the prism pitch and is preferably 50 μm or less. The sheet thickness of the prism lens is preferably large from the strength viewpoint but is preferably small from the optical viewpoint in order to suppress light absorption. The sheet thickness is preferably in the range of 50 μm to 1000 μm to balance these properties.

An example of a method for producing a prism lens by using the photocurable resin composition of the present invention is a method that involves applying the composition to a mold, such as a die or a resin mold, having a prism pattern, smoothing and flattening the surface of the applied composition, placing a transparent substrate on the surface, and applying an active energy ray through the transparent substrate so as to cure the composition.

Examples of the transparent substrate used here include plastic substrates composed of acrylic resins, polycarbonate resins, polyester resins, polystyrene resins, fluorocarbon resins, and polyimide resins, and glass substrates.

The prism sheet obtained by the aforementioned method may be used as is, or the transparent substrate may be removed so that the prism lens is used by itself. When the prism sheet is used in such a manner that the prism portions remain on the transparent substrate, the surface of the transparent substrate is preferably subjected to an adhesion improving treatment such as a primer treatment in order to enhance the adhesion between the prism lens and the transparent substrate.

In the case where the transparent substrate is removed before use, the surface of the transparent substrate is preferably treated with silicone or a fluorine-based releasing agent so that the transparent substrate can be easily removed.

When the photocurable resin composition of the present invention is used in an optical material such as the prism lens usage described above, the refractive index of the cured product is preferably 1.5560 or more.

EXAMPLES

The present invention will now be described in specific details through Examples and Comparative Examples which do not limit the scope of the present invention. In the examples, parts and % are all on a mass basis except for the light transmittance.

In the present invention, the viscosity was measured with an E-type rotating viscometer (RE80U produced by Toki Sangyo Co., Ltd.) at 25° C.

In the present invention, the refractive index was measured with an Abbe refractometer (NAR-3T produced by ATAGO CO., LTD.). The temperature condition was normally 25° C., and for a material that is solid at 25° C., an appropriate temperature was set for measurement.

Example 1

Into a 5 L flask equipped with a stirrer, a gas inlet tube, a condenser, and a thermometer, 174.2 g (1 mol) of tolylene diisocyanate, 250.3 g (1 mol) of 4,4'-diphenylmethane diisocyanate, 421 g of benzyl acrylate, 2000 ppm of 3,5-di-tert-butyl-4-hydroxytoluene, 200 ppm of methylhydroquinone, and 350 ppm of tin octanoate were added. To the resulting mixture, 232.2 g (2 mol) of 2-hydroxyethyl acrylate was added slowly dropwise, and the resulting mixture was heated to 80° C., followed by performing reaction for 2 hours. Then 325.2 g (1 mol) of ethylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-1) was obtained.

The raw material monomer composition, and the refractive index and viscosity of the urethane acrylate resin composition (a-1) obtained are shown in Table 1.

Example 2

Into a 5 L flask equipped with a stirrer, a gas inlet tube, a condenser, and a thermometer, 174.2 g (1 mol) of tolylene diisocyanate, 250.3 g (1 mol) of 4,4'-diphenylmethane diisocyanate, 750 g of 2-phenylphenoxyethyl acrylate, 2000 ppm of 3,5-di-tert-butyl-4-hydroxytoluene, 200 ppm of methylhydroquinone, and 350 ppm of tin octanoate were added. To the resulting mixture, 688.8 g (2 mol) of caprolactone 2-modified hydroxyethyl acrylate was slowly added dropwise. The resulting mixture was heated to 80° C., followed by performing reaction for 2 hours. To the resulting mixture, 325.2 g (1 mol) of an ethylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-1) was obtained.

The raw material monomer composition, and the refractive index and viscosity of the urethane acrylate resin composition (a-2) obtained are shown in Table 1.

Example 3

Into a 5 L flask equipped with a stirrer, a gas inlet tube, a condenser, and a thermometer, 174.2 g (1 mol) of tolylene diisocyanate, 250.3 g (1 mol) of 4,4'-diphenylmethane diisocyanate, 982 g of 2-phenylphenoxyethyl acrylate, 2000 ppm of 3,5-di-tert-butyl-4-hydroxytoluene, 200 ppm of methylhydroquinone, and 350 ppm of tin octanoate were added. To the resulting mixture, 232.2 g (2 mol) of 2-hydroxyethyl acrylate was slowly added dropwise. The resulting mixture was heated to 80° C., followed by performing reaction for 2 hours. To the resulting mixture, 325.2 g (1 mol) of an ethylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-3) was obtained.

The raw material monomer composition, and the refractive index and viscosity of the urethane acrylate resin composition (a-3) obtained are shown in Table 1.

Comparative Example 1

Into a 5 L flask equipped with a stirrer, a gas inlet tube, a condenser, and a thermometer, 348.4 g (2 mol)) of tolylene diisocyanate, 905 g of 2-phenylphenoxyethyl acrylate, 2000 ppm of 3,5-di-tert-butyl-4-hydroxytoluene, 200 ppm of methylhydroquinone, and 350 ppm of tin octanoate were added. To the resulting mixture, 232.2 g (2 mol) of 2-hydroxyethyl acrylate was slowly added dropwise. The resulting mixture was heated to 80° C., followed by performing reaction for 2 hours. To the resulting mixture, 325.2 g (1 mol) of an ethylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-4) was obtained.

The raw material monomer composition, and the refractive index and viscosity of the urethane acrylate resin composition (a-4) obtained are shown in Table 1.

Comparative Example 2

Into a 5 L flask equipped with a stirrer, a gas inlet tube, a condenser, and a thermometer, 348.4 g (2 mol)) of tolylene diisocyanate, 289 g of 2-phenylphenoxyethyl acrylate, 2000 ppm of 3,5-di-tert-butyl-4-hydroxytoluene, 200 ppm of methylhydroquinone, and 350 ppm of tin octanoate were added. To the resulting mixture, 917 g (2 mol) of caprolactone 2-modified hydroxyethyl acrylate was slowly added dropwise. The resulting mixture was heated to 80° C., followed by performing reaction for 2 hours. To the resulting mixture, 325.2 g (1 mol) of ethylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-5) was obtained.

The raw material monomer composition, and the refractive index and viscosity of the urethane acrylate resin composition (a-5) obtained are shown in Table 1.

Comparative Example 3

Into a 5 L flask equipped with a stirrer, a gas inlet tube, a condenser, and a thermometer, 78.1 g (0.5 mol) of tolylene diisocyanate, 375.5 g (1.5 mol) of 4,4'-diphenylmethane diisocyanate, 337 g of benzyl acrylate, 2000 ppm of 3,5-di-tert-butyl-4-hydroxytoluene, 200 ppm of methylhydroquinone, and 350 ppm of tin octanoate were added. To the resulting mixture, 232.2 g (2 mol) of 2-hydroxyethyl acrylate was slowly added dropwise. The resulting mixture was heated to 80° C., followed by performing reaction for 2 hours. To the resulting mixture, 325.2 g (1 mol) of an ethylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-6) was obtained. The obtained urethane acrylate resin composition (a-6) was in a crystal state.

The raw material monomer composition and the refractive index of the urethane acrylate resin composition (a-6) obtained are shown in Table 1.

Comparative Example 4

Into a 5 L flask equipped with a stirrer, a gas inlet tube, a condenser, and a thermometer, 139.4 g (0.8 mol) of tolylene diisocyanate, 300.4 g (1.2 mol) of 4,4'-diphenylmethane diisocyanate, 399 g of benzyl acrylate, 2000 ppm of 3,5-di-tert-butyl-4-hydroxytoluene, 200 ppm of methylhydroquinone, and 350 ppm of tin octanoate were added. To the resulting mixture, 232.2 g (2 mol) of 2-hydroxyethyl acrylate was slowly added dropwise. The resulting mixture was heated to 80° C., followed by performing reaction for 2 hours. To the resulting mixture, 325.2 g (1 mol) of ethylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-7) was obtained. The obtained urethane acrylate resin composition (a-7) was in a crystal state.

The raw material monomer composition and the refractive index of the urethane acrylate resin composition (a-7) obtained are shown in Table 1.

Comparative Example 5

Into a 5 L flask equipped with a stirrer, a gas inlet tube, a condenser, and a thermometer, 500.6 g (2 mol) of 4,4'-diphenylmethane diisocyanate, 525 g of benzyl acrylate, 2000 ppm of 3,5-di-tert-butyl-4-hydroxytoluene, 200 ppm of methylhydroquinone, and 350 ppm of tin octanoate were added. To the resulting mixture, 232.2 g (2 mol) of 2-hydroxyethyl acrylate was slowly added dropwise, and the resulting mixture was heated to 80° C., followed, by performing reaction for 2 hours. To the resulting mixture, 492.6 g (1 mol) of ethylene oxide 3-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-8) was obtained. The obtained urethane acrylate resin composition (a-8) was in a crystal state.

The raw material monomer composition and the refractive index of the urethane acrylate resin composition (a-8) obtained are shown in Table 1.

Comparative Example 6

Into a 5 L flask equipped with a stirrer, a gas inlet tube, a condenser, and a thermometer, 500.6 g (2 mol) of 4,4'-diphenylmethane diisocyanate, 512 g of benzyl acrylate, 2000 ppm of 3,5-di-tert-butyl-4-hydroxytoluene, 200 ppm of methylhydroquinone, and 350 ppm of tin octanoate were added. To the resulting mixture, 232.2 g (1 mol) of 2-hydroxyethyl acrylate was slowly added dropwise, and the resulting mixture was heated to 80° C., followed by performing reaction for 2 hours. To the resulting mixture, 460.6 g (1 mol) of propylene oxide 2-mol adduct of bisphenol A was added in divided portions over 1 hour.

After all was added, reaction was conducted at 80° C. for 4 hours. The reaction was continued until the infrared absorption spectrum at 2250 cm$^{-1}$ indicating the isocyanate group disappeared. As a result, a urethane acrylate resin composition (a-9) was obtained. The obtained urethane acrylate resin composition (a-9) was in a crystal state.

The raw material monomer composition and the refractive index of the urethane acrylate resin composition (a-9) obtained are shown in Table 1.

TABLE 1

| | | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| Glycol | BPA(EO2) (g) | 325.2 | 325.2 | 325.2 | 325.2 | 325.2 | 325.2 | 325.2 | | |
| | (mol) | (1 mol) | (1 mol) | (1 mol) | (1 mol) | (1 mol) | (1 mol) | (1 mol) | | |
| | BPA(EO3) (g) | | | | | | | | 492.6 | |
| | (mol) | | | | | | | | (1 mol) | |
| | BPA(PO2) (g) | | | | | | | | | 460.6 |
| | (mol)) | | | | | | | | | (1 mol) |
| Diisocyanate | TDI (g) | 174.2 | 174.2 | 174.2 | 348.4 | 348.4 | 78.1 | 139.4 | | |
| | (mol) | (1 mol) | (1 mol) | (1 mol) | (2 mol) | (2 mol) | (0.5 mol) | (0.8 mol) | | |
| | MDI (g) | 250.3 | 250.3 | 250.3 | | | 375.5 | 300.4 | 500.6 | 500.6 |
| | (mol) | (1 mol) | (1 mol) | (1 mol) | | | (1.5 mol) | (1.2 mol) | (2 mol) | (2 mol) |
| Acrylate | HEA (g) | 232.2 | | 232.2 | 232.2 | | 232.2 | 232.2 | 232.2 | 232.2 |
| | (mol) | (2 mol) | | (2 mol) | (2 mol) | | (2 mol) | (2 mol) | (2 mol) | (2 mol) |
| | CL2-HEA (g) | | 688.8 | | | | | | | |
| | (mol) | | (2 mol) | | | | | | | |

TABLE 1-continued

|  |  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
| Polymerizable diluting agent | CL3-HEA (g) (mol) |  |  |  |  | 917 (2 mol) |  |  |  |  |
|  | BZA (mass %) | 30 |  |  |  |  | 25 | 25 | 30 | 30 |
|  | OPPEA (mass %) |  | 50 | 50 | 50 | 30 |  |  |  |  |
| Evaluation | Refractive index (25° C., with diluting agent) | 1.569 | 1.565 | 1.585 | 1.578 | 1.547 | 1.578 | 1.575 | 1.572 | 1.569 |
|  | Viscosity (25° C., Pa · s) | 80 | 23 | 420 | 31 | 86 | Crystallized | Crystallized | Crystallized | Crystallized |

<Footnotes for Table 1>
BPA(EO2): ethoxylated bisphenol A (ethylene oxide 2-mol modified product)
BPA(EO3): ethoxylated bisphenol A (ethylene oxide 3-mol modified product)
BPA(PO2): 2,2-bis(4-polyoxypropylene-oxyphenyl)propane
BEPDO: 2-butyl-2-ethylpropanediol
BPA(PG): bisphenol A (prooxy glycol)
TDI: 2,4-toluene diisocyanate
MDI: 4,4'-diphenylmethane diisocyanate
HEA: hydroxyethyl acrylate
CL2-HEA: caprolactone 2-modified hydroxyethyl acrylate
CL3-HEA: caprolactone 3-modified hydroxyethyl acrylate
BZA: benzyl acrylate
OPPEA: 2-phenylphenoxyethyl acrylate Example 4 and Example 7

Photocurable resin compositions were prepared by using the urethane acrylate composition (a-3) obtained in Example 3 and the urethane acrylate composition (a-4) obtained in Comparative Example 1 by adding components whose contents are shown in Table 2.

Each of the photocurable resin compositions obtained was interposed between a chromium-plated metal plate and a transparent untreated polyethylene terephthalate film (PET film), and the thickness thereof was adjusted. Ultraviolet light was applied at a dose of 800 mJ/cm2 to the composition from the PET film side by using an ultrahigh pressure mercury lamp so as to cure the composition. Then the active energy-cured resin layer was separated from the metal plate and the PET film to obtain a cured resin film (F) having a smooth and flat surface and a thickness of 200±25 μm.

Each of the photocurable resin compositions obtained was interposed between a mold carrying a pattern shape of linearly arranged unit prisms (pitch: 50 μm, height: 25 μm) and an enhanced-adhesion transparent PET film (trade name: A4300, thickness: 125 μm produced by TOYOBO CO., LTD.) serving as a transparent substrate. The photocurable resin composition was cured by irradiation with 500 mJ/cm2 of ultraviolet light from an ultrahigh pressure mercury lamp from the PET film side. The PET film together with the active energy ray-cured resin layer was separated from the mold. As a result, a PET film shape-attached cured product (L) having the desired shape transferred thereto was obtained.

The photocurable resin compositions, the cured resin film (F), the PET film shape-attached cured product (L), and the acrylic resin plate flat cured product (S) were subjected to various measurement and evaluation as described below. The results are indicated in Table 1, Table 2(1), and Table 2(2). These are merely examples of the measurement results of Examples and Comparative Examples.

(1) Viscosity measurement: An E-type rotating viscometer was used to measure the viscosity (mPa·s) of the active energy ray-curable resin composition for casting polymerization at 25° C.

(2) Refractive index measurement: Liquid samples and cured samples were subjected to measurement. A liquid sample of an active energy ray-curable resin composition for casting polymerization was directly applied to a prism of an Abbe refractometer and measurement was conducted at 25° C.

(3) Restorability: The length of time taken for a mark made by a metal circular rod having a diameter of 10 mm on a PET-film-attached cured product (L) obtained as above to disappear completely was measured.
AA: Disappeared instantaneously
A: Disappeared within 60 seconds
B: Disappeared within 1 to 60 minutes
C: Did not disappear (4) Evaluation of adhesiveness: The acrylic resin plate flat cured product (S) was used to measure the adhesion between the transparent substrate and the cured resin layer according to JIS K-5400. Samples which had 95 or more remaining squares out of 100 squares were rated A, those which had 60 to 94 remaining squares out of 100 squares were rated B, and those which had 59 or less remaining squares out of 100 squares were rated C.

TABLE 2

|  | Example 3 | Comparative Example 7 |
|---|---|---|
| Urethane acrylate composition (a-3) obtained in Example 3 | 20 |  |
| Urethane acrylate composition (a-4) obtained in Comparative Example 1 |  | 20 |
| BPA(EO20)DA | 30 | 30 |
| OPPEA | 50 | 50 |
| 184D | 4 | 4 |
| TPO | 1 | 1 |
| Total | 105 | 105 |
| nD | 1.5562 | 1.5554 |
| Vis (25° C.) | 840 | 780 |
| Restorability | A | A |
| Adhesiveness | A | A |

The invention claimed is:

1. A plastic lens obtained by curing the radically polymerizable composition comprising a urethane (meth)acrylate resin (A) and a polymerizable diluting agent (B) as essential components, wherein the urethane (meth)acrylate resin is obtained by a reaction of an aromatic diisocyanate compound (a), a polyol compound (b), and a hydroxyl-group-containing (meth)acrylate compound (c) as essential raw material components, and contains, as urethane structural moieties derived from the aromatic diisocyanate compound (a), a structural moiety (a-1) represented by structural formula (1) below:

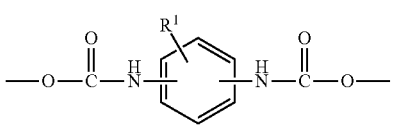

(where $R^1$ represents a hydrogen atom or a methyl group) and a structural moiety (a-2) represented by structural formula (2) below:

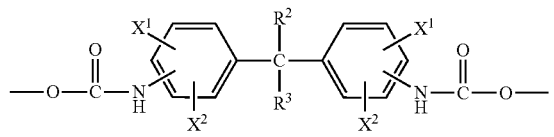

(where $R^1$, $R^2$, $R^3$, $X^1$, and $X^2$ each independently represent a hydrogen atom or a methyl group) at a (a-1)/(a-2) molar ratio of 45/55 to 60/40; and the polyol compound (b) has an aromatic hydrocarbon skeleton.

2. The plastic lens according to claim 1, wherein the polyol compound (b) which is a raw material component of the urethane (meth)acrylate resin (A) is a bisphenol compound.

3. The plastic lens according to claim 1, wherein the hydroxyl-group-containing (meth)acrylate compound (c) which is a raw material component of the urethane (meth)acrylate resin (A) is a (meth)acrylic acid or a lactone adduct thereof.

4. The plastic lens according to claim 1, wherein the radically polymerizable composition has a viscosity in a range of 10 to 500 P·as at 25° C.

5. The plastic lens according to claim 1, wherein the radically polymerizable composition further comprises a photopolymerization initiator (C) in addition to the urethane (meth)acrylate resin (A) and a polymerizable diluting agent (B).

6. The plastic lens according to claim 5, wherein the polyol compound (b) which is a raw material component of the urethane (meth)acrylate resin (A) is a bisphenol compound.

7. The plastic lens according to claim 5, wherein the hydroxyl-group-containing (meth)acrylate compound (c) which is a raw material component of the urethane (meth)acrylate resin (A) is a (meth)acrylic acid or a lactone adduct thereof.

8. The plastic lens according to claim 5, wherein the radically polymerizable composition has a viscosity in a range of 10 to 500 Pas at 25° C.

* * * * *